Oct. 6, 1925.  
E. H. WRIGHT  
1,556,566  
PHOTOGRAPHIC AND PROJECTION SYSTEM FOR OBTAINING STEREOSCOPIC EFFECTS  
Filed March 12, 1925
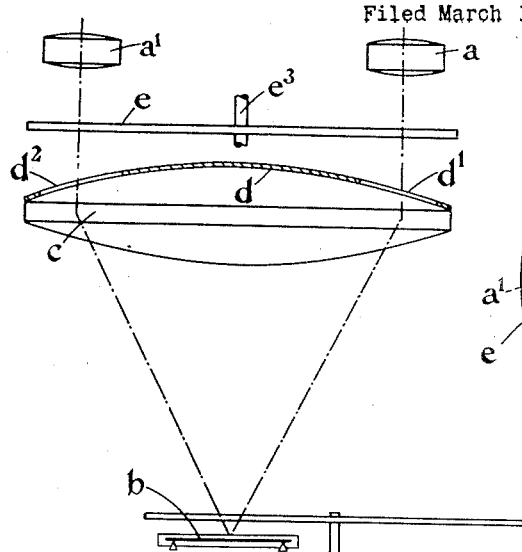
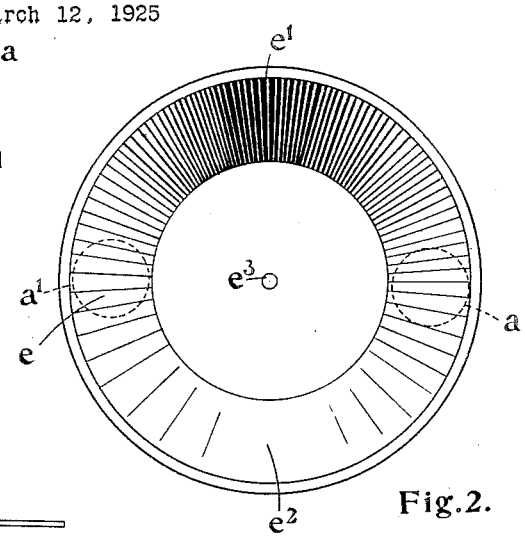
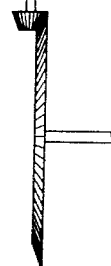
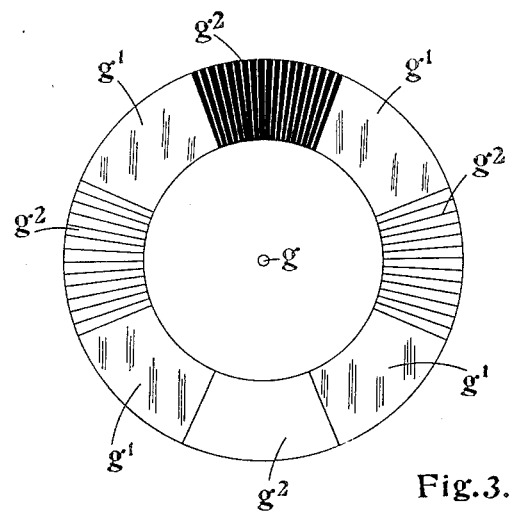
Fig.1.
Fig.2.
Fig.3.
Inventor  
E. H. Wright  
by  
W. S. Every  
Attorney.

Patented Oct. 6, 1925.

1,556,566

UNITED STATES PATENT OFFICE.

EDWIN HERBERT WRIGHT, OF BRIGHTON, ENGLAND.

PHOTOGRAPHIC AND PROJECTION SYSTEM FOR OBTAINING STEREOSCOPIC EFFECTS.

Application filed March 12, 1925. Serial No. 15,068.

*To all whom it may concern:*

Be it known that I, EDWIN HERBERT WRIGHT, a subject of the King of Great Britain and Ireland, residing at Moy Villa, Harrington Road, Brighton, England, have invented certain new and useful Improvements in and Relating to Photographic and Projection Systems for Obtaining Stereoscopic Effects, of which the following is a specification.

This invention relates to an improved method for obtaining stereoscopic effects.

Various methods for the purpose of obtaining stereoscopic effects in kinematography have been proposed, for example in one such method views taken either successively or simultaneously from right and left eye view points are projected and superimposed upon the screen.

In practice it has been found that, even when the superposition in projection of the respective right and left hand images is accurate, an undesirable effect of lateral flicker or double image upon the projection screen results.

The present invention has among its objects to prevent or minimize this effect when images derived from separated view points are superimposed upon the film or other photographic base and are projected upon a screen.

According to the invention, in order to secure improved stereoscopic effects under conditions in which right and left hand views are respectively caused to dissolve or fade simultaneously with the gradual appearance of a left or right hand view, the right and left hand views are either photographed or printed in superposition under the said conditions so that the dissolving or fading out occurs in the successive images produced upon the film or other photographic base.

According to the invention, moreover, a negative film is produced having the successive images thereon formed by superposition of corresponding right and left hand views, the complete dissolving or fading of the right and left hand views one into the other being effected over two or more successive images.

According to the invention, moreover, the means employed for carrying out the method referred to comprise, for example, a shutter or shutters or the equivalent adapted to alternately prevent and allow the passage of light from the respective right and left hand views to a gradually or successively increasing and decreasing extent.

The invention further comprises the features hereinafter described.

The invention is hereinafter described by way of example with reference to the accompanying diagrammatic drawings in which Figure 1 illustrates a stereoscopic camera adapted for the purpose of the invention.

Figure 2 represents a plan view of the shutter $e$ Figure 1.

Figure 3 represents a modified form of the shutter by which the use of a separate obturator may be dispensed with.

In carrying the invention into effect and with reference to Figure 1 of the accompanying drawings, the right and left hand views collected by the respective objective lenses $a$, $a^1$ are superimposed upon the film or other photographic base $b$ in known manner by means of the lens $c$ which is masked by a non-actinic or other light obscuring disc $d$ having two apertures $d^1$, $d^2$ therein in diametrically opposed positions corresponding respectively to the positions of the objective lenses $a$, $a^1$. This masking of the lens has been found to have the effect of converting such a single lens into two separate and distinct lenses of the same focal length, while the images, projected through the respective apertures, become superimposed upon the film or other photographic base.

Intermediate the objective lenses $a$, $a^1$ and the lens $c$, or in any other suitable position, a shutter $e$ is provided, consisting of a rotatable circular disc of glass or other suitable translucent medium, which, by means of neutral tinting, that is, by colouring with any suitable tint which, when sufficiently opaque, will not admit of photographic exposure, is adapted to permit of minimum or zero exposure through one part $e^1$ (Figure 2) which is of maximum opacity, and in part completely opaque, gradually increasing to maximum exposure through the part $e^2$ of least opacity 180° from the part $e^1$ and then gradually decreasing back again to minimum or zero exposure at the part $e^1$. By this means while the part $e^1$ of greatest opacity is obscuring the right hand image, the transparent part $e^2$ or part of least opacity will be allowing the exposure of the left hand image and vice versa, the change taking place in a gradual or successive manner upon rotation of the shutter $e$ which is advantageously disposed midway between the axes of the objective lenses $a$, $a^1$. Thus in successive images upon the film or other photographic base the left and right hand views which are superimposed thereon respectively predominate to a successively increased and decreased extent. For example, in one image, the left hand picture may be of maximum intensity while the right hand picture is of minimum intensity, and in succeeding images the left hand picture successively decreases in intensity while the right hand picture successively increases in intensity and vice versa. By such means an effect of dissolving of one view into the other is secured upon projection of the successive images in the usual manner.

In some cases, for example, where the axis of the shutter $e$ is disposed otherwise than between the axes of the objective lenses, the shutter may be advantageously provided with two concentric rings of gradually or successively varying opacity as hereinbefore described, the graduation of the rings being such that the parts of maximum opacity of the respective rings are diametrically opposed, so that while the shutter is in a position where the left hand image is obscured by the opaque part or part of greatest opacity of one ring the right hand image is passing through the transparent part or part of least opacity of the other ring.

An obturator $f$ of known kind is disposed between the lens $c$ and the film $b$ or other photographic base or in any other suitable position for the purpose of preventing access of light to the film during the successive feed movements thereof and such obturator may either be geared to the shutter $e$ or may be operated independently of the shutter.

The obturator $f$ may be dispensed with in the use of a dissolving shutter $g$ as illustrated in Figure 3 which is provided with non-actinic or other suitable light obscuring parts $g^1$ for the purpose of preventing the passage of light during the feed movement of the film, which parts alternate with parts $g^a$ the opacity of which gradually or successively increases and decreases in the manner hereinbefore described.

In Figures 2 and 3 the increasing and decreasing opacity of the shutter is indicated in the drawings by the radially disposed shade lines.

A standard projector may thus be utilized for the projection of stereoscopic pictures, it being unnecessary to use two separate films or two separate projectors.

A printing machine adapted to operate in the same or similar manner may be employed in which right and left hand images on the same or separate films may be superimposed directly upon a film so that in the resultant superimposed images, the respective right and left hand images will alternately predominate to a gradually or successively increasing and decreasing extent, the film being afterwards projected by any standard projector.

It will be understood that the invention is not limited to the details hereinbefore described, for example, an endless band graduated by tinting in a manner similar to that of the disc hereinbefore described may be provided to pass over rollers, sprockets or the like, through a suitable point in the optical system.

I claim:

In a stereoscopic cinematographic camera a pair of objective lenses spaced apart at substantially the normal ocular distance, a support for holding a photographic film in position for exposure, a superimposing lens disposed between the said objective lenses and the said support, a mask disposed adjacent the said superimposing lens and having two apertures therein whose axes coincide substantially with the axes of the said objective lenses, a rotatable disc disposed between the said objective lenses and the said superimposing lens, the said rotatable disc having its axis disposed centrally between the said objective lenses and parallel with the axes thereof and being of graded transparency which increases and decreases circumferentially, the transparency being at a maximum and at a minimum in diametrically opposite positions, and obturating means for preventing access of light to the film while the latter is moved for the exposure of successive image spaces thereof.

EDWIN H. WRIGHT.